United States Patent [19]
Joubert

[11] 3,952,689
[45] Apr. 27, 1976

[54] VEHICLE REGISTRATION AND VELOCITY DISPLAY DEVICE

[75] Inventor: Pierre-Rene Joubert, Dollard des Ormeaux, Canada

[73] Assignee: The Raymond Lee Organization, Inc., New York, N.Y. ; a part interest

[22] Filed: Mar. 12, 1975

[21] Appl. No.: 557,676

[52] U.S. Cl. .................................. 116/57; 116/116
[51] Int. Cl.² .......................................... B60Q 1/54
[58] Field of Search ................. 116/57, 37, 116, 38; 340/62, 263, 264

[56] References Cited
UNITED STATES PATENTS

| | | | |
|---|---|---|---|
| 1,091,059 | 3/1914 | Gore | 116/57 |
| 1,204,539 | 11/1916 | Benson et al. | 116/57 |
| 2,146,349 | 2/1934 | Provenzano | 340/264 |
| 2,903,684 | 9/1959 | McClintock | 340/263 |
| 3,180,309 | 4/1965 | Clason | 116/57 |

FOREIGN PATENTS OR APPLICATIONS

| | | | |
|---|---|---|---|
| 16,011 | 5/1912 | Denmark | 116/116 |

Primary Examiner—S. Clement Swisher
Assistant Examiner—Denis E. Corr
Attorney, Agent, or Firm—Daniel Jay Tick

[57] ABSTRACT

A housing is mounted on the roof of a vehicle. The housing has a top parallel to the roof of a vehicle and a plurality of sides extending perpendicularly between the top of the housing and the roof of the vehicle. Translucent visual indicating devices are provided on the top and each of the sides of the housing and visually indicate the registration number of the vehicle. A lamp device in the housing illuminates the indicating devices and produces a plurality of colors corresponding to the speed of the vehicle.

2 Claims, 5 Drawing Figures

VEHICLE REGISTRATION AND VELOCITY DISPLAY DEVICE

DESCRIPTION OF THE INVENTION

The present invention relates to a vehicle registration and velocity display device.

Objects of the invention are to provide a vehicle registration and velocity display device of simple structure, which is inexpensive in manufacture, installable with facility and convenience on new and existing vehicles, and functions efficiently, effectively and reliably to clearly indicate the registration number of a vehicle and to display the velocity of the vehicle, so that law enforcement officers and people in the vicinity of the vehicle are alerted to the fact when it is traveling at an illegal speed, and thus functions as a deterent to speeders, since each operator of a vehicle is also presented with an indication of the velocity of his vehicle and is aware of the fact that the velocity indication is being broadcast visually.

In order that the invention may be readily carried into effect, it will now be described with reference to the accompanying drawing, wherein:

FIG. 3 is a sectional view, taken along the lines III—III, of FIG. 2.

In the FIGS., the same components are identified by the same reference numerals.

Figure 1:
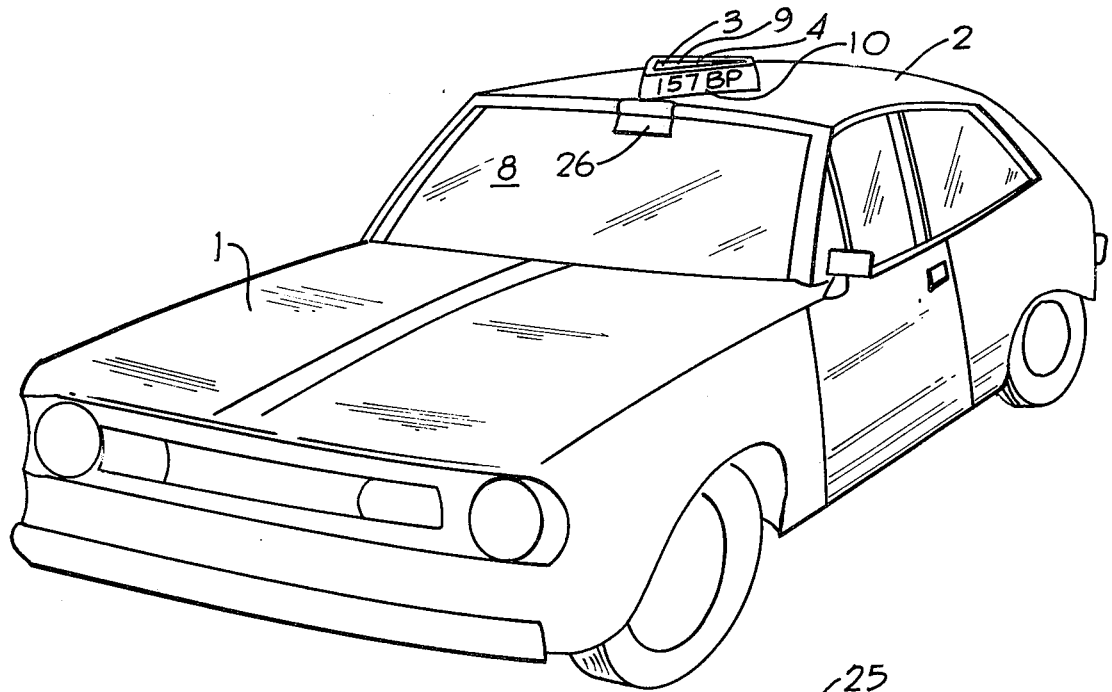
FIG. 1 is a perspective view of an embodiment of the vehicle registration and velocity display device of the invention.

The vehicle registration and velocity display device of the invention is for a vehicle 1 having a roof 2, as shown in FIG. 1, and a registration number. For the purposes of illustration, the registration number of the vehicle, which presently appears on a license plate or plates, is assumed to be 157BP.

Figure 2:
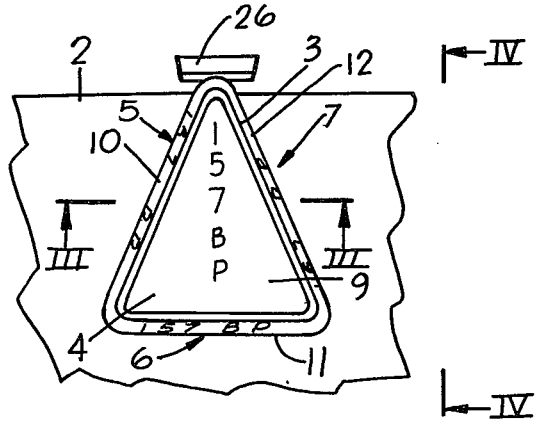
FIG. 2 is a top view of the embodiment of FIG. 1.
Figure 4:
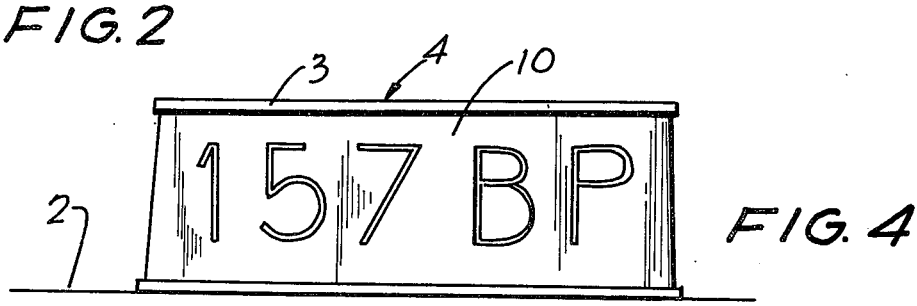
FIG. 4 is a view, on an enlarged scale, taken along the lines IV—IV, of FIG. 2.

The vehicle registration and velocity display device of the invention comprises a housing 3 (FIGS. 1 to 4) mounted on the roof 2 of the vehicle 1. The housing 3 has a top 4 substantially parallel to the roof of the vehicle (FIGS. 1 to 4) and a plurality of sides 5, 6 and 7 (FIG. 2) extending substantially perpendicularly between the top 4 and the roof of the vehicle. The housing 3 is positioned at the front of the roof 2 adjacent the windshield 8 of the vehicle (FIG. 1) and preferably has three sides. The top of the housing 3 is preferably of substantially equilateral, triangular configuration.

Translucent visual indicating devices 9, 10, 11 and 12 (FIG. 2) such as, for example, translucent plastic, glass, or the like, are provided on the top and each of the sides of the housing 3. The translucent visual indicating devices visually indicate the registration number of the vehicle. Thus, for example, each of the translucent indicating devices comprises a translucent plastic plate with the registration number of the vehicle such as, for example, 157BP, inscribed, painted, or otherwise indicated, thereon.

Figure 5:
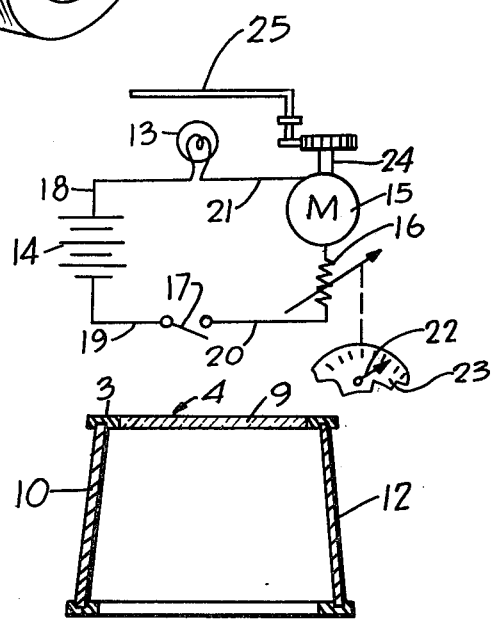
FIG. 5 is a circuit diagram of an embodiment of the vehicle registration and velocity display device of the invention.

As shown in FIG. 5, a lamp device is provided in the housing for illuminating the indicating devices 9, 10, 11 and 12. The lamp device produces a plurality of colors corresponding to the speed of the vehicle 1. The lamp device may comprise any suitable device for producing a plurality of colors corresponding to the speed of the vehicle, thus, for example, as shown in FIG. 5, the lamp device comprises a lamp 13 electrically connected with a battery 14 of the vehicle, a motor 15, a motor control unit 16 and a switch 17 in a circuit 18, 19, 20, 21. The motor control unit 16 is mechanically coupled to the indicator 22 of the speedometer 23 of the vehicle in a manner whereby the rotation of the motor is proportional to the movement of the indicator. The motor shaft 24 is coupled to a semicircular disc member 25 having a plurality of different colored sectors thereon and comprising transparent material.

The disc member 25 is positioned over the lamp 13 in a manner whereby the light produced by the lamp is colored in accordance with the particular sector of the disc member passing thereover at a particular time. Thus, for example, the disc member 25 is initially positioned so that a green sector thereof is over the lamp 13 and any movement of the speedometer indicator 22 up to a predetermined point moves the disc member correspondingly, but retains the green sector over the lamp. After the predetermined point, any higher speed of the speedometer resulting in a further clockwise movement of the speedometer indicator 22 moves an orange sector, for example, over the lamp until a local speed limit is reached by the speedometer indicator. Further clockwise movement of the speedometer indicator 22 then moves a red sector, for example, over the lamp 13.

A light conducting member 26 (FIGS. 1 and 2) extends from the housing 3 over part of the windshield 8 and indicates to the operator of the vehicle by its color what the speed of the vehicle is.

The display device of the invention thus provides a means for easy and vastly improved enforcement of speed limits, positive photographic identification of a vehicle from the air or the ground, vital life saving functions, fuel conservation, and many other advantages.

While the invention has been described by means of a specific example and in a specific embodiment, I do not wish to be limited thereto, for obvious modifications will occur to those skilled in the art without departing from the spirit and scope of the invention.

I claim:

1. A vehicle registration and velocity display device for a vehicle having a roof, a windshield and a registration number, said display device comprising a housing mounted on a vehicle and having a top substantially parallel the roof of the vehicle and a plurality of sides extending substantially perpendicularly between the top of the housing and the roof of the vehicle, said housing being positioned on the roof of the vehicle at the front thereof adjacent the windshield;

translucent visual indicating means on the top and each of the sides of the housing visually indicating the registration number of the vehicle;

lamp means in the housing for illuminating the indicating means, said lamp means producing a plurality of colors corresponding to the speed of the vehicle; and a light conducting member extending from the housing over part of the windshield for indicating to an operator of the vehicle the color of the lamp means and therefore the speed of the vehicle.

2. A display device as claimed in claim 1, wherein the housing has three sides and the top is of substantially equilateral triangular configuration.

* * * * *